United States Patent Office 2,797,205
Patented June 25, 1957

2,797,205

MIXTURES OF A RESINOUS SULFUR DIOXIDE-UNSATURATED ORGANIC COMPOUND AND A CONJUGATED DIENE-UNSATURATED NITRILE RUBBERY COPOLYMER

Willie W. Crouch, Bartlesville, Okla., assignor to Phillips Petroleum Company, a corporation of Delaware No Drawing. Application April 20, 1953,
Serial No. 349,953

21 Claims. (Cl. 260—45.5)

This invention relates to improved sulfur dioxide-unsaturated organic compound resins. In one aspect, it relates to such resins having incorporated therein additives which improve the molding characteristics, impact strength, toughness, and other desirable properties of said resins. In another aspect, it relates to a mixed resin comprising an admixture of a sulfur dioxide-unsaturated organic compound resin and a rubbery polymer of a conjugated diene with an unsaturated nitrile. In another aspect, it relates to a novel method for producing said resins.

Resins produced by the interaction of sulfur dioxide with unsaturated organic compounds are known in the art. The art is continually endeavoring to obtain additives for these resins which will improve the properties of the resins, particularly the molding characteristics, impact strength, and toughness, as well as heat stability.

According to this invention, there is provided a novel resinous composition comprising a sulfur dioxide-unsaturated organic compound resin admixed with a rubbery copolymer of a conjugated diene with an unsaturated nitrile. Further, in accordance with this invention, there is provided a method for producing an improved sulfur dioxide-unsaturated organic compound resin, which method comprises admixing with a sulfur dioxide-unsaturated organic compound resin a copolymer of a conjugated diene with an unsaturated nitrile. The admixing is suitably accomplished by the use of a mill of the type ordinarily used in the milling of rubber.

The unsaturated organic compounds which are employed for interaction with sulfur dioxide to produce polysulfone resins which, in turn, are incorporated with conjugated diene-nitrile type rubbery copolymers to prepare the products of this invention, include a variety of materials. Among the materials which are considered applicable are open-chain monoolefins, cycloolefins, diolefins, and acetylenes. Olefins suitable as starting materials are 1-butene, 2-butene, isobutylene, pentenes, octenes, cyclohexene, methylcyclohexene, and 4-cyclohexyl-1-butene. Substituted olefins such as styrene and alpha-methylstyrene can also be used. Suitable acetylenes are acetylene and methylacetylene. Diolefins which can be employed include 1,3-butadiene, isoprene, pentadiene, and hexadienes. Various other materials which are also applicable are allyl alcohol, allylacetic acid, allyl chloride, vinyl chloride, vinyl bromide, vinyl acetate, acrylonitrile, methacrylonitrile, methyl acrylate, ethyl acrylate, methyl methacrylate, butyl acrylate, allyl ethyl ether, o-allylanisole, o-allylphenol, p-bromoallylbenzene, methyl undecylenate, undecylenyl alcohol, undecylenic acid, and various other unsaturated organic compounds which will react with sulfur dioxide to produce heteropolymeric compounds. It is frequently desired to employ a mixture of unsaturated compounds rather than a single material and when such mixtures are used, the resulting resin appears to have been formed by copolymerization of the unsaturated compounds with sulfur dioxide since its properties do not correspond to blends produced from the individual unsaturated organic compounds.

In one of the specific embodiments of this invention the polysulfone resin is produced by the interaction of sulfur dioxide with an unsaturated organic compound, suitably a hydrocarbon such as 1-butene, 2-butene, propylene, butylene, a pentene, a hexene, cyclohexene, or the like together with a minor amount of a third component which is an unsaturated organic compound such as acrylonitrile, methacrylonitrile, methyl acrylate, ethyl acrylate, methyl methacrylate, butyl acrylate, vinyl acetate and the like. Resins of this type have improved thermal stability and, when employed in the production of the compositions of this invention, give products which have especially good molding characteristics, high impact strength, and high tensile strength, as well as other desirable properties.

The copolymerization reaction, i. e., the reaction of an unsaturated compound or mixture of unsaturated compounds with sulfur dioxide, is conducted in accordance with the techniques known in the art. The reaction can be effected in solution such as in an acetone or hydrocarbon solution or in the presence of a large excess of liquid sulfur dioxide which serves as a solvent. It is sometimes preferred that the polysulfone resin be formed in an emulsion system in accordance with the technique of Crouch and Cotten, Serial No. 8,755, filed February 16, 1948, now Patent No. 2,645,631. According to this type of polymerization the ingredients to be polymerized are dispersed in a fluid medium such as water with the addition of a surface-active agent or emulsifier, and are subjected to conditions suitable to promote the reaction. After the conclusion of the reaction, the product is coagulated by any suitable means such as the addition of methanol or an ionizing salt such as sodium chloride, magnesium sulfate, or potassium sulfate.

Catalysts which are employed for the reaction are oxidizing agents such as potassium persulfate, hydrogen peroxide, peracetic acid, nitric acid, organic peroxides such as tertiary butyl peroxide and benzoyl peroxide, and nitrates of the alkali metals and ammonium.

Temperatures employed for the reaction are generally in the range between 0 and 150° F., preferably between 40 and 120° F., and more preferably between 80 and 110° F. The reaction time is generally in the range between one and 20 hours, preferably between 5 and 8 hours. The pressure employed is sufficient to maintain the reaction mixture substantially completely in the liquid phase.

The mol ratio of sulfur dioxide to unsaturated organic compound is preferably at least 1:1 and more preferably in the range between 1:1 and 10:1. In many instances the mol ratio of sulfur dioxide to unsaturated organic compound, is in the range between 1:1 and 3:1. As hereinbefore stated, sulfur dioxide can be used as the solvent as well as the reactant. In such cases a large molar excess of sulfur dioxide with respect to the unsaturated compound is employed and, as in other instances, the reaction is effected under sufficient pressure to maintain the mixture substantially completely in the liquid phase.

In instances where it is desired to prepare a polysulfone resin which is a terpolymer, i. e., a resin formed by the interaction of sulfur dioxide, an unsaturated hydrocarbon, and a minor amount of a third component which is an unsaturated nitrile, an ester of acrylic or methacrylic acid, vinyl acetate, or similar compound, as hereinbefore described, the amount of this latter ingredient in the starting mixture is generally in the range between 0.5 and 20 mol percent based on the total amount of unsaturated organic compound reactants present in the mixture. A more preferred range is between 2 and 10 mol percent.

Rubbery copolymers employed for incorporation with polysulfone resins are copolymers of conjugated dienes with unsaturated nitriles such as acrylonitrile and methacrylonitrile. Conjugated dienes which are employed in the production of these rubbery copolymers are preferably those which contain from four to six, inclusive, carbon atoms per molecule and include 1,3-butadiene, isoprene, piperylene, methylpentadiene, 2,3-dimethyl-1,3-butadiene, chloroprene, and the like. However, conjugated dienes having more than six, such as eight, carbon atoms per molecule can also be used. Rubbery copolymers which are often preferred are copolymers of butadiene with acrylonitrile.

When preparing the conjugated diene-unsaturated nitrile type rubbery copolymers, the amounts of starting materials can be varied over a considerable range. Generally the amount of conjugated diene is in the range between 50 and 95 parts by weight per 100 parts of monomeric material and the amount of nitrile type monomer is in the range between 50 and 5 parts by weight per 100 parts of monomeric material. These rubbery polymers can be prepared by any method known to the art.

The rubbery polymers can be incorporated into the polysulfone resins by any method desired. They can be blended on the mill or, if desired, latices of the polysulfones and rubbery copolymers can be prepared and blended under conditions such that precoagulation of either component does not occur. Coprecipitation of the combined latices may be effected by any suitable means such as by the addition of methanol and sodium chloride. Reference is made to Crouch Patent U. S. 2,593,414 (1952) for a more detailed discussion of this method of operation.

When preparing the resin compositions of this invention, the amount of rubbery conjugated diene-unsaturated nitrile copolymer employed is generally in the range between 1 and 100 parts by weight per 100 parts by weight of polysulfone resin with an amount in the range between 1 and 40 parts by weight being most frequently preferred.

While it is not usually necessary that additional plasticizers or stabilizers for the polysulfone resin compositions be employed, in some instances it is desirable that either one or both be present. Stabilizers which are frequently used are those of the metal alkyl dithiophosphate type such as are described in a copending application of Wicklatz and Howe, Serial No. 275,471, filed March 7, 1952, now Patent No. 2,735,835. Other stabilizers which can be employed include metallic tin, a tin hydroxide, a tin oxide, a tin salt (see U. S. 2,599,813), organic mono- and polysulfides (Crouch and Howe, Serial No. 204,070, filed January 2, 1951, now Patent No. 2,643,241), amides (Wicklatz and Howe, Serial No. 236,276, filed July 11, 1951, now Patent No. 2,758,982), imides (Wicklatz and Howe, Serial No. 241,688, filed August 13, 1951, now Patent No. 2,643,237), esters of tetrathiophosphoric acid and trithiophosphorous acid (Wicklatz and Howe, Serial No. 275,472, filed March 7, 1952, now Patent No. 2,735,832), reaction products of vinylcyclohexene with hydrogen sulfide (Fanning and Dees, Serial No. 325,034, filed December 9, 1952, now Patent No. 2,750,352), napthalenethiols (Fanning, Serial No. 319,788, filed November 10, 1952, now Patent No. 2,721,851), benzimidazolethiols (Fanning and Louthan, Serial No. 321,728, filed November 20, 1952, now Patent No. 2,742,447), various thiophosphoric acid derivatives other than the metal alkyl dithiophosphates (Fanning, Serial No. 332,106, filed January 19, 1953, now Patent No. 2,735,836), etc. Plasticizers which can be employed include various organic phosphoric acid derivatives such as are described in a copending application of Crouch and Howe, Serial No. 125,272, filed November 3, 1949, now abandoned, sulfonamides (Crouch and Howe, Serial No. 127,166, filed November 14, 1949, now abandoned), nitriles (see U. S. 2,607,752), and the like.

*Example I*

A series of polysulfone resins, copolymers and terpolymers, was prepared by reacting sulfur dioxide with the following unsaturated compounds:

(1) 1-butene.
(2) A mixture of 1-butene with ethyl acrylate in a ratio of 90/10 parts by weight.
(3) A mixture of 1-butene with ethyl acrylate in a ratio of 80/20 parts by weight.
(4) A mixture of 1-butene with acrylonitrile in a ratio of 90/10 parts by weight.
(5) A mixture of 1-butene with acrylonitrile in a ratio of 94/6 parts by weight.
(6) A mixture of 1-butene with methyl methacrylate in a ratio of 90/10 parts by weight.

The resins were prepared in accordance with the following recipes (quantities given are in parts by weight):

|  | I | II | III | IV | V | VI |
|---|---|---|---|---|---|---|
| 1-Butene ([1]) | 46.7 | 42.0 | 36.4 | 42.0 | 43.9 | 42.0 |
| Ethyl acrylate |  | 4.67 | 9.34 |  |  |  |
| Acrylonitrile |  |  |  | 4.67 | 2.8 |  |
| Methyl methacrylate |  |  |  |  |  | 4.67 |
| Sulfur dioxide | 88.3 | 88.3 | 88.3 | 88.3 | 88.3 | 88.3 |
| Water | 220 | 220 | 220 | 220 | 220 | 220 |
| NH$_4$NO$_3$ | 0.5 | 0.5 | 0.5 | 0.5 | 0.5 | 0.5 |
| Maprofix MM ([2]) | 1.0 | 1.0 | 1.0 | 1.0 | 1.0 | 1.0 |

[1] A product of technical grade containing not less than 95 mol percent 1-butene.
[2] Sodium lauryl sulfate dispersing agent commercially available in the form of a paste containing about 60 percent solids.

The polysulfone resins were generally prepared at a temperature of 100° F. and a pressure of approximately 75-90 p. s. i. g. At the conclusion of the reaction the excess sulfur dioxide was vented. The latex was coagulated with methanol and the resin filtered, washed with water, and dried 72 hours at 140° F. in a forced draft oven.

Zinc dilauryl dithiophosphate (2 percent by weight) was incorporated into each resin and the resulting materials were blended on the mill with different amounts of a butadiene/acrylonitrile rubber prepared by the polymerization of a 67/33 mixture of butadiene with acrylonitrile (Hycar OR-15). From these blends tensile bars and bars for the determination of impact resistance and heat distortion were made by compression molding. The various physical properties which were determined are shown in the following table. A control was run using the resin prepared according to recipe II without the incorporation of the butadiene/acrylonitrile rubber. Another control using the resin prepared according to recipe IV without the incorporation of the butadiene/acrylonitrile rubber was also run.

| Polysulfone | | Rubber, Parts | Tensile, p.s.i. | Impact,[1] ft. lbs./ inch of notch | Heat Distortion Temp.[2] | | Heat Stability, percent loss in 1 hr. at 375° F. |
|---|---|---|---|---|---|---|---|
| From Recipe | Parts | | | | ° C. at 66 p.s.i. | ° C. at 264 p.s.i. | |
| I | 80 | 20 | 1,641 | 0.66 | | 71.8 | |
| II | 85 | 15 | 4,533 | 0.67 | 86.1 | 77.5 | |
| II | 80 | 20 | 4,150 | 0.82 | 86.1 | 77.7 | 4.2 |
| II | 75 | 25 | 3,485 | 0.79 | 87.5 | 75.1 | |
| III | 80 | 20 | 4,362 | 0.35 | | 75.7 | |
| IV | 80 | 20 | 3,920 | 0.59 | 90.6 | | 4.6 |
| V | 80 | 20 | 5,570 | 0.44 | 96.5 | | 6.2 |
| VI | 80 | 20 | 4,260 | [4]>1.0 | 90.0 | | 5.2 |
| II | 100 | | | 0.3 | | | [3]11.4 |
| IV | 100 | | 5,450 | 0.29 | 94 | 88 | |

[1] ASTM D256-43T (Charpy method).
[2] ASTM D 648-45T.
[3] No stabilizer present.
[4] Maximum value which testing device will measure.

The foregoing data show that the compositions of this invention have greater impact strength than the polysulfone resins containing no butadiene-acrylonitrile rubber.

*Example II*

A resin composition was prepared from 20 parts of the butadiene/acrylonitrile rubbery copolymer described in Example I with 80 parts of a 1-butene/ethyl acrylate/sulfur dioxide resin prepared in accordance with recipe II of Example I. The following formulation was employed:

| | Parts by weight |
|---|---|
| Polysulfone resin | 80 |
| Hycar OR-15 (butadiene-acrylonitrile copolymer) | 20 |
| Zinc dicetyl dithiophosphate | 1.6 |
| Titanium dioxide | 0.5 |
| Cadmium red | 3.0 |

The composition was molded in an injection molding machine which was used in production work for making radio knobs about 1.5 inches in diameter. The mold used for the run was made of polished steel. The composition filled the cavities without excessive flashing and formed molded pieces with strong weld-lines. The moldings were tough and resistant to impact. Pieces which were deliberately broken showed no preferred point of initial failure and usually did not break at the weld-line. The resin composition performed satisfactorily from the standpoint of thermal stability at cylinder temperatures as high as 400° F. There was no evidence of excessive evolution of decomposition products after the resin composition was allowed to remain in the cylinder of the machine at temperatures ranging from 350 to 390° F. over a 30-minute period and at the end of the test there was no evidence of corrosion of the mold.

*Example III*

A series of butadiene/acrylonitrile rubbery copolymers was prepared at 41° F. in accordance with the following recipe:

| | Parts by weight |
|---|---|
| Monomers | 100 |
| Water | 180 |
| Santomerse No. 3 [1] | 1.5 |
| Mercaptan blend [2] | Variable |
| tert-Butylisopropylbenzene hydroperoxide | 0.104 |
| KOH | 0.04 |
| K4P2O7 | 0.177 |
| FeSO4.7H2O | 0.14 |

[1] Alkyl aryl sodium sulfonate.
[2] A blend of tertiary $C_{12}$, $C_{14}$, and $C_{16}$ aliphatic mercaptans in a ratio of 3:1:1 parts by weight.

The following table shows the monomer ratios, amount of mercaptan blend, and time-conversion data:

| Butadiene/ acrylonitrile, Parts | Mercaptan Blend, Parts | Time, Hours | Conversion, Percent |
|---|---|---|---|
| 90/10 | 0.3 | 17 | 50 |
| 85/15 | 0.3 | 7.75 | 59.5 |
| 85/15 | 0.75 | 9.5 | 70.6 |
| 75/25 | 0.3 | 5.5 | 60 |
| 50/50 | 0.3 | 2.25 | 72 |

Several resin compositions were prepared by blending each of the foregoing butadiene/acrylonitrile copolymers, and also Hycar OR-15, with a 1-butene/ethyl acrylate/sulfur dioxide resin (prepared in accordance with recipe II of Example I), using 20 parts by weight of the rubber, 80 parts by weight of the polysulfone, and 1.6 parts by weight of zinc dilauryl dithiophosphate. The following table shows the results of tensile strength and impact tests. The various butadiene/acrylonitrile rubbers are listed in the same order as given in the preceding table.

| Rubber Used | Tensile, p.s.i. | Impact,[1] ft. lbs. |
|---|---|---|
| Hycar OR-15 | 3,150 | 0.82 |
| 90/10 Butadiene/acrylonitrile | 2,335 | 0.31 |
| 85/15 Butadiene/acrylonitrile | 2,025 | 0.31 |
| 85/15 Butadiene/acrylonitrile | 2,640 | 0.61 |
| 75/25 Butadiene/acrylonitrile | 2,355 | 0.41 |
| 50/50 Butadiene/acrylonitrile | 3,270 | 1.2+ |

[1] Measured by dropping a ball of known weight from a measured height onto samples of approximately the same thickness.

The foregoing data show satisfactory tensile and impact strength on the part of the compositions of this invention.

*Example IV*

Two polysulfone resins were prepared by reacting sulfur dioxide with mixtures of 1-butene and methyl methacrylate, the last two ingredients being used in weight ratios of 99/1 and 94/6, respectively. Zinc dilauryl dithiophosphate (1.6 percent by weight) was incorporated into each resin and the resulting material was blended on the mill with the butadiene/acrylonitrile rubber described in Example I using the polysulfone and rubber in a ratio of 80/20 parts by weight. From each blend, bars for the determination of impact strength and heat distortion were made by compression molding while tensile bars were made by injection molding. The following results were obtained:

| 1-Butene/Methyl Methacrylate Ratio | Tensile, p. s. i. | Impact,[1] ft. lbs./in. notch | Heat Distortion [2] Temp., °C. at 66 p. s. i. | Heat Stability, percent loss in 1 hr. at 375° F. |
|---|---|---|---|---|
| 99/1 | 1,660 | [3] >1 | 88 | 4.8 |
| 94/6 | 2,730 | 0.7 | 90 | 5.4 |

[1] ASTM D 256—43T (Charpy method).
[2] ASTM D 648–45T.
[3] Maximum value which machine will measure.

*Example V*

Two polysulfone resins were prepared by reacting sulfur dioxide with mixtures of 1-butene and acrylonitrile, the last two ingredients being used in weight ratios of 99/1 and 97/3, respectively. Zinc dilauryl dithiophosphate (1.6 percent by weight) was incorporated into each resin and the resulting material was blended on the mill with the butadiene/acrylonitrile rubber described in Example I, using the polysulfone and rubber in a ratio of 80/20 parts by weight. Tensile strength, impact strength, and heat distortion bars were prepared and tests made as described in Example IV. Results of the physical tests were as follows:

| 1-Butene/Acrylonitrile Ratio | Tensile, p. s. i. | Impact, ft. lbs./in. notch | Heat Distortion Temp., °C. at 66 p. s. i. | Heat Stability, percent loss in 1 hr. at 375° F. |
|---|---|---|---|---|
| 99/1 | 2,250 | [1] >1 | 89 | 7.5 |
| 97/3 | 1,960 | [1] >1 | 83.5 | 8.4 |

[1] As in Example IV.

*Example VI*

Sulfur dioxide was reacted with mixtures of 1-butene with ethyl acrylate, the last two ingredients being used in weight ratios of 99/1, 97/3, and 94/6, respectively. Zinc dilauryl dithiophosphate (1.6 percent by weight) was incorporated into each resin. Blends of each resin with the butadiene/acrylonitrile rubber described in Example I were then prepared using 80 parts by weight polysulfone and 20 parts rubber. Test samples were prepared and physical tests made as described in Example IV. The following results were obtained:

| 1-Butene/Ethyl Acrylate Ratio | Tensile, p. s. i. | Impact, ft. lbs./in. notch | Heat Distortion Temp., °C. at 66 p. s. i. | Heat Stability, percent loss in 1 hr. at 375° F. |
|---|---|---|---|---|
| 99/1 | 2,730 | 0.66 | 87 | 4.4 |
| 97/3 | 2,726 | [1] >1 | 89.5 | 4.6 |
| 94/6 | 3,191 | [1] >1 | 89 | 4.8 |

[1] As in Example IV.

*Example VII*

A polysulfone was prepared by reacting sulfur dioxide with a 90/10 mixture of 1-butene and acrylic acid (parts are by weight). Zinc dilauryl dithiophosphate (1.6 percent by weight) was incorporated into the resin. A blend was then prepared using 80 parts by weight of the polysulfone and 20 parts of the butadiene/acrylonitrile rubber described in Example I. Tensile strength, impact strength, and heat distortion bars were prepared and tests made as described in Example IV. Physical tests gave the following results:

Tensile, p. s. i _____ 2850
Impact strength, ft. lbs./in. notch [1] _____ 0.77
Heat distortion, °C. at 66 p. s. i. [1] _____ 93
Heat stability, percent loss in 1 hr. at 375° F ____ 6.2

[1] As in Example IV.

Variation and modification are possible within the scope of the disclosure and the claims to this invention, the essence of which is that an improved resin is provided by incorporating into a sulfur dioxide-unsaturated organic compound resin a copolymer of a conjugated diene with an unsaturated nitrile.

The starting materials disclosed herein are not necessarily equivalents each of the other. The specific starting materials to be used in any specific instance depend on the specific properties of the final compositions that are desired, as is evident from the foregoing examples.

I claim:

1. A composition comprising resin, formed by the reaction of sulfur dioxide with an unsaturated organic compound which will interact with sulfur dioxide to form a polysulfone resin, admixed with a rubbery copolymer of a conjugated diene and an unsaturated nitrile selected from the group consisting of acrylonitrile and methacrylonitrile.

2. A composition according to claim 1 wherein said resin is a sulfur dioxide-olefin resin.

3. A composition according to claim 1 in which said resin is a sulfur dioxide-1-butene resin.

4. A composition according to claim 1 in which said resin is a product of reaction of sulfur dioxide with 1-butene and ethyl acrylate.

5. A composition according to claim 1 in which said resin is a sulfur dioxide-1-butene-ethyl acrylate resin and said rubbery copolymer is a copolymer of butadiene and acrylonitrile.

6. A composition according to claim 1 wherein said resin is a sulfur dioxide-1-butene-acrylonitrile resin and said rubbery copolymer is a copolymer of 1,3-butadiene and acrylonitrile.

7. A composition according to claim 1 wherein said resin is a sulfur dioxide-1-butene-methyl methacrylate resin and said rubbery copolymer is a copolymer of 1,3-butadiene and acrylonitrile.

8. A composition according to claim 1 wherein said resin is a binary sulfur dioxide-1-butene resin, and said rubbery copolymer is a copolymer of 1,3-butadiene and acrylonitrile.

9. A composition according to claim 1 wherein said resin is a sulfur dioxide-1-butene resin and said rubbery copolymer is a copolymer of 1,3-butadiene and methacrylonitrile.

10. A composition according to claim 1 wherein the weight ratio of said resin to said copolymer is in the range 100:1 to 1:1.

11. A composition according to claim 1 wherein the weight ratio of said resin to said copolymer is in the range 100:1 to 100:40.

12. A composition according to claim 1 wherein said resin is produced by the reaction of sulfur dioxide with 1-butene and methylmethacrylate.

13. A method which comprises milling together a rubbery polymer of a conjugated diene and an unsaturated nitrile selected from the group consisting of acrylonitrile and methacrylonitrile with a resin formed by the reaction of sulfur dioxide with an unsaturated organic compound which will interact with sulfur dioxide to form a polysulfone resin, and recovering a mixed resin so produced.

14. A method according to claim 13 wherein the weight ratio of said resin to said copolymer is in the range 100:1 to 100:40.

15. An improved resin composition comprising 100 parts by weight of a resinous copolymer of sulfur dioxide and an olefinic hydrocarbon and from 1 to 40 parts by weight of a rubbery copolymer of a conjugated diene and an unsaturated aliphatic nitrile having a carbon-carbon olefinic double bond, said composition having a higher impact strength than said copolymer of sulfur dioxide and olefinic hydrocarbon alone.

16. A composition according to claim 15 wherein said diene has from 4 to 8 carbon atoms per molecule.

17. A resin composition having an impact strength greater than 0.3 foot-pound per inch of notch and prepared by milling together, 100 parts by weight of a terpolymer of $SO_2$, 1-butene, and ethyl acrylate and from 1 to 40 parts by weight of a rubbery copolymer of 1,3-butadiene and acrylonitrile.

18. A resin composition having an impact strength greater than 0.3 foot-pound per inch of notch and prepared by milling together 100 parts by weight of a binary copolymer of $SO_2$ and 1-butene with from 1 to 40 parts by weight of a rubbery copolymer of 1,3-butadiene and acrylonitrile.

19. A resin composition having an impact strength greater than 0.3 foot-pound per inch of notch and prepared by milling together 100 parts by weight of a terpolymer of $SO_2$, 1-butene, and acrylonitrile and from 1 to 40 parts by weight of a rubbery copolymer of 1,3-butadiene and acrylonitrile.

20. A resin composition having an impact strength greater than 0.3 foot-pound per inch of notch and prepared by milling together 100 parts by weight of a terpolymer of $SO_2$, 1-butene, and methyl methacrylate and from 1 to 40 parts by weight of a rubbery copolymer of 1,3-butadiene and acrylonitrile.

21. A composition according to claim 1 wherein said resin is a sulfur dioxide-1-butene-acrylic acid resin and said rubbery copolymer is a copolymer of 1,3-butadiene and acrylonitrile.

References Cited in the file of this patent

UNITED STATES PATENTS

| | | |
|---|---|---|
| 2,372,299 | Snow | Mar. 27, 1945 |
| 2,593,414 | Crouch | Apr. 22, 1952 |
| 2,637,664 | Howe | May 5, 1953 |